(12) United States Patent
Lynn

(10) Patent No.: US 10,971,870 B2
(45) Date of Patent: Apr. 6, 2021

(54) CONNECTION INTERFACE FOR A PANEL AND SUPPORT STRUCTURE

(71) Applicant: David Lynn, Welcome, NC (US)

(72) Inventor: David Lynn, Welcome, NC (US)

(*) Notice: Subject to any disclaimer, the term of this patent is extended or adjusted under 35 U.S.C. 154(b) by 73 days.

(21) Appl. No.: 16/104,565

(22) Filed: Aug. 17, 2018

(65) Prior Publication Data

US 2020/0059049 A1    Feb. 20, 2020

(51) Int. Cl.
*H01R 13/73* (2006.01)
*H02S 40/36* (2014.01)
*H02S 40/34* (2014.01)

(52) U.S. Cl.
CPC ............. *H01R 13/73* (2013.01); *H02S 40/34* (2014.12); *H02S 40/36* (2014.12)

(58) Field of Classification Search
CPC ......... H02S 40/36; H02S 40/34; H01R 13/73; H01L 31/02008; H01L 31/048; H01L 31/05
USPC ......................................... 439/65, 510, 512
See application file for complete search history.

(56) References Cited

U.S. PATENT DOCUMENTS

| 854,153 A | 5/1907 | Dodds |
|---|---|---|
| 3,015,045 A | 12/1961 | Ward |
| 3,298,730 A | 1/1967 | Soley |
| 3,920,212 A | 11/1975 | Westwood |
| 3,974,581 A | 8/1976 | Martens et al. |
| 3,975,813 A | 8/1976 | Bell |
| 4,185,261 A | 1/1980 | Nagata |
| 4,339,853 A | 7/1982 | Lipschitz |
| 4,570,194 A | 2/1986 | Schatteman |
| 4,651,136 A | 3/1987 | Anderson et al. |
| 4,718,681 A | 1/1988 | Kakehi et al. |
| 4,919,464 A | 4/1990 | Richards |
| 5,009,243 A | 4/1991 | Barker |
| 5,038,535 A | 8/1991 | Van Praag, III |
| 5,061,112 A | 10/1991 | Monford, Jr. |
| 5,076,623 A | 12/1991 | Richards |
| 5,094,567 A | 3/1992 | Nista et al. |
| 5,125,601 A | 6/1992 | Monford, Jr. |
| 5,337,459 A | 8/1994 | Hogan |
| 5,485,733 A | 1/1996 | Hoffman |
| 5,644,177 A | 7/1997 | Guckel et al. |
| 5,781,974 A | 7/1998 | Breil et al. |
| 6,066,796 A | 5/2000 | Itoyama et al. |
| 6,084,498 A | 7/2000 | Stelter et al. |

(Continued)

FOREIGN PATENT DOCUMENTS

| CN | 103715286 A | 4/2014 |
|---|---|---|
| CN | 203690320 U | 7/2014 |

(Continued)

*Primary Examiner* — Abdullah A Riyami
*Assistant Examiner* — Marcus E Harcum
(74) *Attorney, Agent, or Firm* — Coats & Bennett, PLLC

(57) ABSTRACT

A connection interface between a panel and a support structure. The panel includes one or more connectors. The support structure supports the panel and is configured to engage with the one or more connectors. The connection interface between the panel and the support structure provides a mechanical connection to secure the panel. The connection interface can also provide for electrical connections between the panel and the support structure and/or between the panel and one or more other panels or remote components.

23 Claims, 16 Drawing Sheets

(56) References Cited

U.S. PATENT DOCUMENTS

| | | | |
|---|---|---|---|
| 6,499,907 B1 | 12/2002 | Baur | |
| 6,584,737 B1 | 7/2003 | Bradley, Jr. | |
| 6,677,846 B2 | 1/2004 | Snider | |
| 6,765,330 B2 | 7/2004 | Baur | |
| 6,786,012 B2 | 9/2004 | Bradley, Jr. | |
| 6,936,789 B2 | 8/2005 | Hanzel | |
| 7,217,059 B1 | 5/2007 | Rudduck | |
| 7,331,616 B2 | 2/2008 | Brei et al. | |
| 7,387,537 B1 * | 6/2008 | Daily | H01R 13/6272 439/281 |
| 7,481,211 B2 | 1/2009 | Klein | |
| 7,501,572 B1 | 3/2009 | Rabinowitz | |
| 7,567,159 B2 | 7/2009 | Macken | |
| 7,631,467 B2 | 12/2009 | Clarke | |
| 7,814,899 B1 | 10/2010 | Port | |
| 7,921,843 B1 | 4/2011 | Rawlings | |
| 7,971,398 B2 | 7/2011 | Tweedie | |
| 8,136,310 B2 | 3/2012 | Tweedie | |
| 8,151,789 B2 | 4/2012 | Klein | |
| 8,156,628 B2 | 4/2012 | Roth | |
| 8,166,836 B2 | 5/2012 | Rudduck | |
| 8,225,557 B2 | 7/2012 | Stearns et al. | |
| 8,413,388 B2 | 4/2013 | Stearns et al. | |
| 8,418,419 B1 | 4/2013 | Aseere et al. | |
| 8,418,688 B2 | 4/2013 | King et al. | |
| 8,453,986 B2 | 6/2013 | Schnitzer | |
| 8,455,752 B2 | 6/2013 | Korman et al. | |
| 8,464,478 B2 | 6/2013 | Tweedie | |
| 8,522,492 B2 | 9/2013 | Tachino | |
| 8,595,996 B2 | 12/2013 | Korman et al. | |
| 8,674,212 B2 | 3/2014 | Huber et al. | |
| 8,733,027 B1 | 5/2014 | Marston et al. | |
| 8,740,642 B2 * | 6/2014 | Keenihan | H01R 31/00 439/510 |
| 8,748,733 B2 | 6/2014 | Leary | |
| 8,752,338 B2 | 6/2014 | Schaefer et al. | |
| 8,756,881 B2 | 6/2014 | West et al. | |
| 8,763,978 B2 | 7/2014 | Newman et al. | |
| 8,776,456 B1 | 7/2014 | Schrock | |
| 8,826,606 B2 | 9/2014 | Yen | |
| 8,881,472 B2 | 11/2014 | Knapp | |
| 8,922,972 B2 | 12/2014 | Korman et al. | |
| 8,950,157 B1 | 2/2015 | Schrock | |
| 8,960,615 B1 | 2/2015 | Johnson et al. | |
| 9,021,841 B2 | 5/2015 | Kottenstette | |
| 9,057,545 B2 | 6/2015 | Stapleton | |
| 9,057,546 B2 | 6/2015 | Sade | |
| 9,080,792 B2 | 7/2015 | Patton et al. | |
| 9,145,685 B2 | 9/2015 | Stapleton | |
| 9,146,009 B2 | 9/2015 | Zhu | |
| 9,106,023 B2 | 11/2015 | Schaefer et al. | |
| 9,225,126 B2 | 12/2015 | Janfada et al. | |
| 9,231,518 B2 | 1/2016 | Cinnamon et al. | |
| 9,252,310 B2 | 2/2016 | Stephan et al. | |
| 9,267,278 B1 | 2/2016 | Gibson | |
| 9,297,169 B2 * | 3/2016 | Pantev | E04F 13/0889 |
| 9,307,797 B2 | 4/2016 | Sanchez Giraldez | |
| 9,331,629 B2 | 5/2016 | Cheung et al. | |
| 9,453,660 B2 | 9/2016 | French et al. | |
| 9,455,662 B2 | 9/2016 | Meine | |
| 9,548,696 B2 | 1/2017 | Atchley et al. | |
| 9,590,344 B2 * | 3/2017 | Krishnamoorthy | H01R 12/732 |
| 9,694,990 B2 | 7/2017 | Voser et al. | |
| 2005/0062296 A1 | 3/2005 | Lyon | |
| 2005/0166383 A1 | 8/2005 | Newberry | |
| 2005/0269827 A1 | 12/2005 | Heard | |
| 2007/0212166 A1 | 9/2007 | Rudduck | |
| 2008/0149170 A1 | 6/2008 | Hanoka | |
| 2009/0114269 A1 | 5/2009 | Fletcher et al. | |
| 2009/0211621 A1 | 8/2009 | LeBlanc | |
| 2009/0215304 A1 * | 8/2009 | Faust | H01R 13/6641 439/358 |
| 2009/0293383 A1 | 12/2009 | Venter et al. | |
| 2010/0175337 A1 | 7/2010 | Mascolo et al. | |
| 2010/0212654 A1 | 8/2010 | Alejo Trevijano | |
| 2010/0319291 A1 | 12/2010 | Pervan et al. | |
| 2011/0079214 A1 | 4/2011 | Hon | |
| 2011/0120532 A1 | 5/2011 | Neugent et al. | |
| 2011/0154774 A1 | 6/2011 | Rawlings | |
| 2011/0203637 A1 | 8/2011 | Patton et al. | |
| 2011/0314751 A1 | 12/2011 | Jette | |
| 2012/0228442 A1 | 9/2012 | Clifton | |
| 2013/0036683 A1 | 2/2013 | Seymour et al. | |
| 2013/0149029 A1 | 6/2013 | Changsrivong et al. | |
| 2013/0174887 A1 * | 7/2013 | Yagi | H02S 40/34 136/244 |
| 2013/0193301 A1 | 8/2013 | Jackson et al. | |
| 2013/0219812 A1 | 8/2013 | Goodman et al. | |
| 2014/0003861 A1 | 1/2014 | Cheung et al. | |
| 2014/0060626 A1 | 3/2014 | Stephan et al. | |
| 2014/0061411 A1 | 3/2014 | Stephan et al. | |
| 2014/0090310 A1 | 4/2014 | Greene | |
| 2014/0090694 A1 * | 4/2014 | Bolanos | H02S 40/36 136/251 |
| 2014/0158184 A1 | 6/2014 | West et al. | |
| 2014/0167424 A1 | 6/2014 | Frias | |
| 2014/0196770 A1 * | 7/2014 | Jacobs, IV | H02S 30/10 136/251 |
| 2014/0305493 A1 * | 10/2014 | Dhir | H02S 40/36 136/251 |
| 2015/0027509 A1 | 1/2015 | Levin | |
| 2015/0146400 A1 * | 5/2015 | Huffman | H05K 1/144 361/790 |
| 2015/0200618 A9 | 7/2015 | West et al. | |
| 2015/0249425 A1 | 9/2015 | Fukumochi | |
| 2015/0256125 A1 | 9/2015 | Kouyanagi et al. | |
| 2015/0288327 A1 | 10/2015 | Cherukupalli et al. | |
| 2015/0295534 A1 | 10/2015 | Maruyama et al. | |
| 2015/0322979 A1 | 11/2015 | Giacalone et al. | |
| 2015/0322980 A1 | 11/2015 | Giacalone et al. | |
| 2015/0330669 A1 | 11/2015 | Port et al. | |
| 2015/0372635 A1 | 12/2015 | Praca et al. | |
| 2016/0056316 A1 | 2/2016 | Clark | |
| 2016/0056752 A1 | 2/2016 | Atchley et al. | |
| 2016/0072426 A1 | 3/2016 | Babineau, Jr. et al. | |
| 2016/0118726 A1 | 4/2016 | Schaefer et al. | |
| 2016/0138833 A1 | 5/2016 | Stephan et al. | |
| 2016/0142006 A1 | 5/2016 | Meine et al. | |
| 2016/0204293 A1 * | 7/2016 | Nakai | H02J 7/35 320/101 |
| 2016/0214547 A1 | 7/2016 | Iriarte Jimenez et al. | |
| 2016/0254774 A1 | 9/2016 | Brady et al. | |
| 2016/0336695 A1 | 11/2016 | Janfada et al. | |
| 2017/0012573 A1 | 1/2017 | Flaherty et al. | |
| 2017/0012574 A1 | 1/2017 | Babineau, Jr. et al. | |
| 2017/0366136 A1 * | 12/2017 | Feldmann | H02S 30/10 |
| 2018/0076762 A1 * | 3/2018 | Hall | H02J 3/46 |
| 2018/0145200 A1 * | 5/2018 | Aliabadi | H01L 31/044 |
| 2018/0351502 A1 * | 12/2018 | Almy | E04D 1/12 |
| 2019/0028054 A1 * | 1/2019 | Karkheck | E04D 1/34 |
| 2019/0199281 A1 * | 6/2019 | Chang | H01L 31/0504 |

FOREIGN PATENT DOCUMENTS

| | | |
|---|---|---|
| DE | 202012100662 U1 | 5/2013 |
| EP | 2746501 A2 | 6/2014 |
| JP | 2012107449 A | 6/2012 |
| JP | 2013040462 A | 2/2013 |
| JP | 2015192480 A | 11/2015 |
| WO | 2004017424 A2 | 2/2004 |
| WO | 2010144637 A1 | 12/2010 |
| WO | 2013026944 A1 | 2/2013 |
| WO | 2013086265 A1 | 6/2013 |
| WO | 2015110254 A1 | 7/2015 |
| WO | 2016020670 A2 | 2/2016 |
| WO | 2016192848 A2 | 12/2016 |
| WO | 2017007467 A1 | 1/2017 |

* cited by examiner

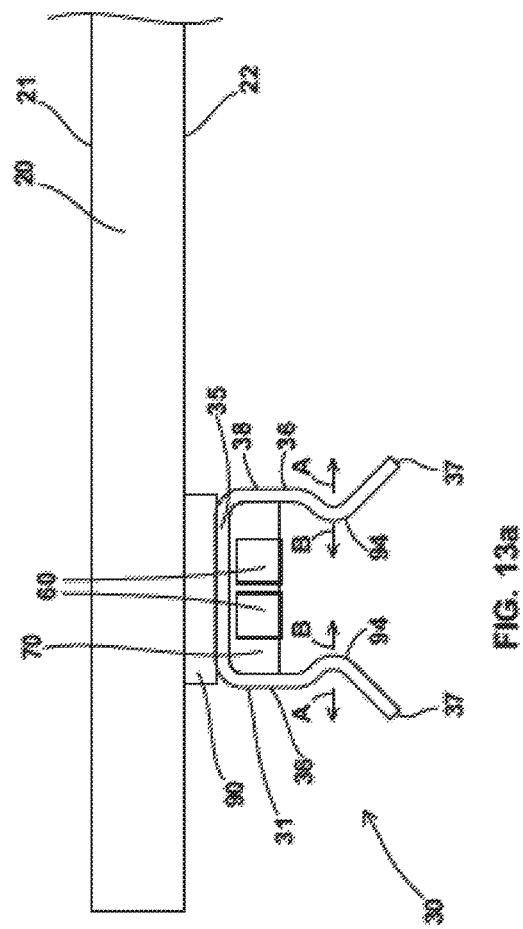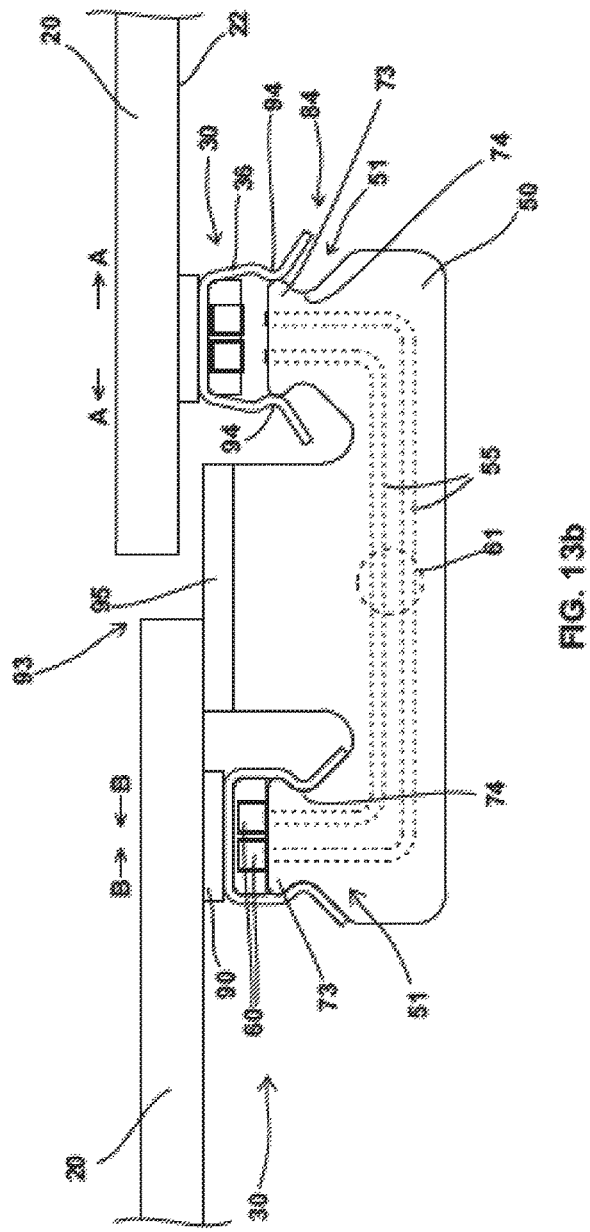

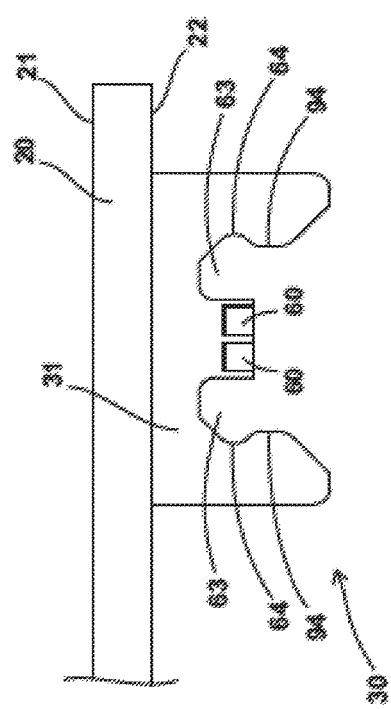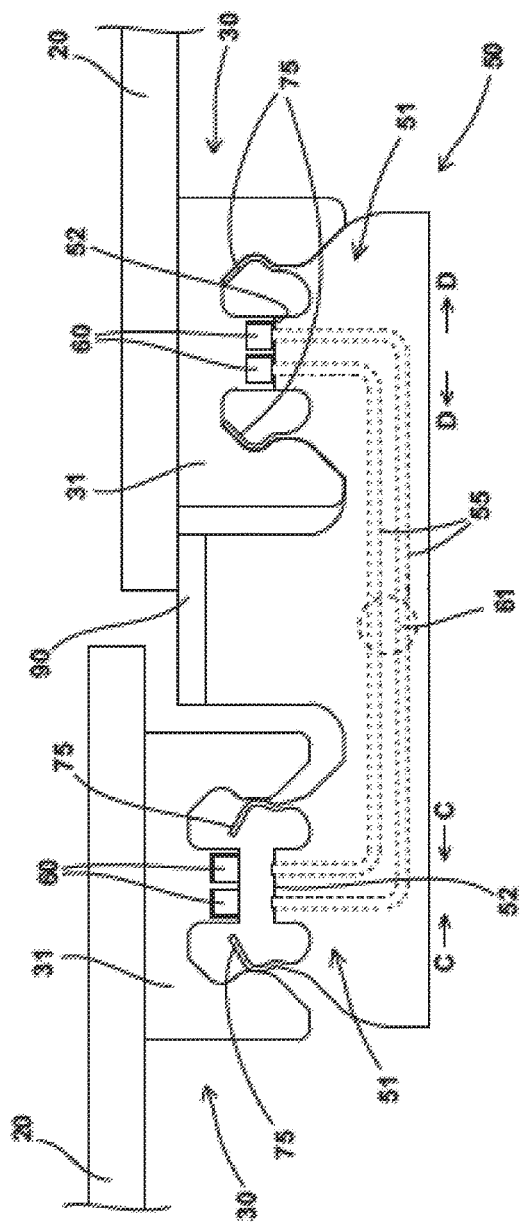

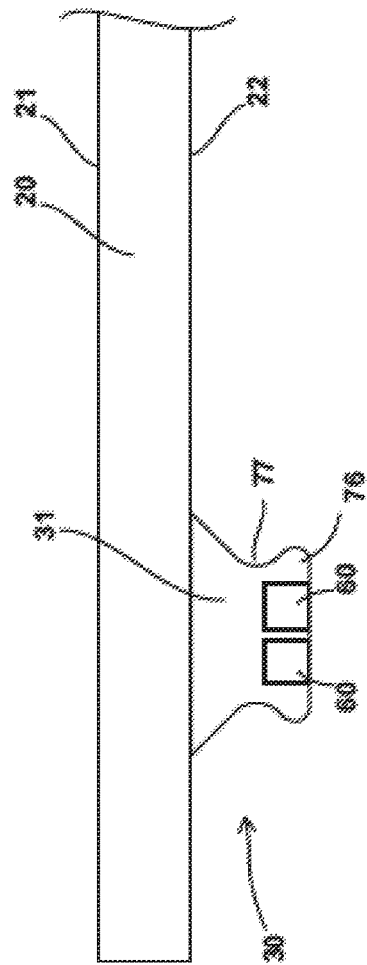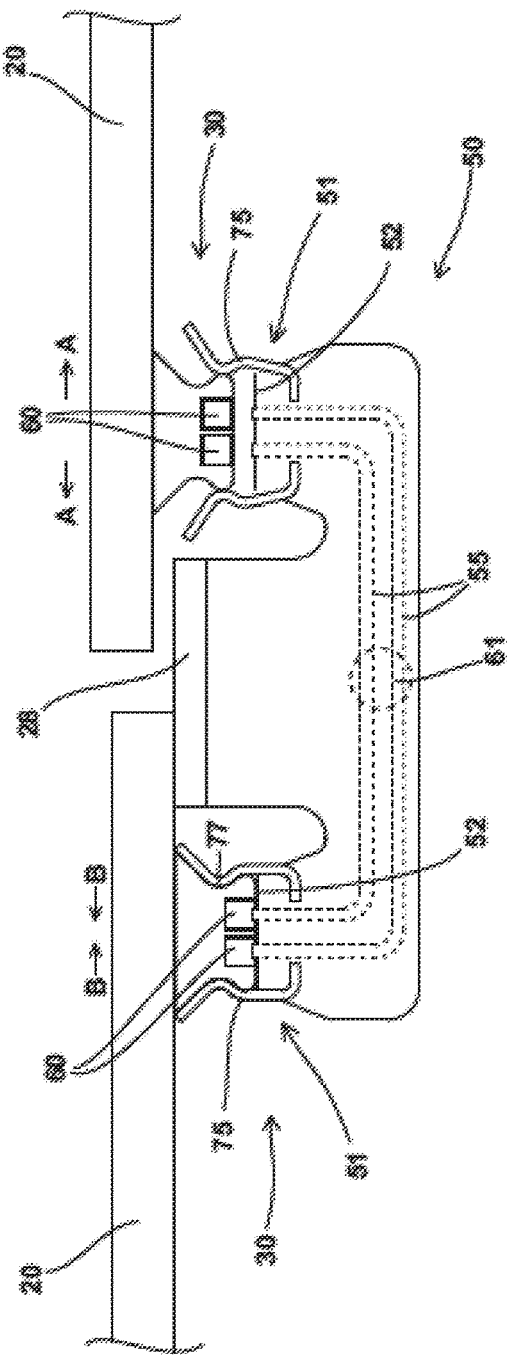

(12)

CONNECTION INTERFACE FOR A PANEL AND SUPPORT STRUCTURE

BACKGROUND

The present application is directed to a connection interface for connecting a panel to a support structure and, more particularly, to a connection interface with a connector that is configured to engage with a receptacle.

Connectors are used in a variety of different applications to connect a first member to a second member. The connectors can be attached to a first member in a variety of different manners. The connectors can be adjustable between a locked position in which the first member is secured to the second member, and an unlocked position in which the first member is not secured to the second member.

The connectors can be positioned on the first member in a manner such that they are not easily accessible. This can occur when the connector is positioned along a back side of the panel in a position that is difficult to access when positioned at the second member. This can make securing the connectors to the second member difficult due to the lack of access. For instance, a connector on the back side of a solar panel may not be accessible to an installer once the solar panel is positioned on the top of a frame. Likewise, a connector on a back of a plywood panel may not be accessible once the panel is placed against wall studs.

SUMMARY

One aspect is directed to an assembly that includes first and second panels. A connector is attached to each of the first and second panels with each of the connectors extending outward from one of the first and second panels. Each of the connectors includes a first shape with a first side and a second side, and a first electrical conductor positioned at the second side. A support structure includes first and second receptacles each including an open side, a bottom side, and walls that extend between the open side and the bottom side. Each of the receptacles has a second shape that complements the first shape and a second electrical conductor positioned at the bottom side. Each of the panels is configured to attach to the support structure as the first shape complements the second shape for each of the first and second connectors to fit within one of the receptacles and each of the first electrical conductors is positioned at and electrically connected to one of the second electrical conductors when the first and second panels are attached to the support member.

In one aspect, the assembly also includes a seal positioned between the first and second receptacles with the seal contacting against each of the panels when the panels are attached to the support member.

In one aspect, the assembly also includes the second electrical conductors at each of the first and second receptacles being electrically connected together.

In one aspect, each of the connectors further includes a first magnetic member positioned at the second side with each of the first and second receptacles further includes a second magnetic member positioned at the bottom side, and for each of the panels the first magnetic member is positioned at the second magnetic member to create a magnetic attraction force that pulls the connector into the receptacle when the panel is attached to the support member.

In one aspect, the first shape is a tapered shape that is wider towards the panel and narrows away from the panel.

In one aspect, the second shape is a tapered shape that is wider at the open side and that narrows towards the closed side.

In one aspect, the first electrical conductor and the first magnetic member are both exposed on the second side of the connector and the second electrical conductor and the second magnetic member are both exposed in the bottom of the receptacle.

In one aspect, each of the connectors includes a base that is positioned towards the panel and first and second arms that extend outward from the base and are spaced apart by a gap with each of the arms comprises an elbow positioned between the base and a tip, and with a width of the gap measured between the arms being greatest at the elbows.

In one aspect, each of the receptacles comprises a first section at the bottom side, a second section at the open side, and a neck section positioned between the closed side and the open side, with a width of the neck section measured between the walls being less than widths of each of the first section and the second section.

One aspect is directed to an assembly that includes a first panel. A first connector is attached to and extends outward from the first panel. The first connector includes a first shape with a first side at the first panel and a second side away from the first panel, and a first electrical conductor positioned at the second side. The assembly includes a second panel and a second connector attached to and extending outward from the second panel. The second connector includes a second shape with a third side at the second panel and a fourth side away from the second panel. The assembly includes a second electrical conductor positioned at the fourth side. The assembly includes a support structure with a first receptacle with a first open side, a first bottom side, and first walls that extend between the first open side and the first bottom side with the first receptacle including a third shape that complements the first shape for the first connector to fit within the first receptacle when the first panel is attached to the support member and with the third receptacle comprising a third electrical conductor positioned at the first bottom side with the third electrical conductor positioned at and electrically connected to the first electrical conductor when the first panel is attached to the support member. The assembly includes a second receptacle with a second open side, a second bottom side, and second walls that extend between the second open side and the second bottom side. The second receptacle includes a fourth shape that complements the second shape for the second connector to fit within the second receptacle when the second panel is attached to the support member with the second receptacle including a fourth electrical conductor positioned at the second closed side, and with the fourth electrical conductor positioned at and electrically connected to the second electrical conductor when the second panel is attached to the support member.

In one aspect, the first shape and the second shape are the same, and the third shape and the fourth shape are the same.

In one aspect, the third and fourth electrical conductors are electrically connected together.

In one aspect, the assembly also includes that each of the first and second connectors has a base and a pair of spaced-apart arms.

In one aspect, the assembly also includes magnetic members in each of the first and second connectors that are attracted to second magnetic members in each of the first and second receptacles with the first and second magnetic members configured to create a magnetic attraction force to pull the first connector into the first receptacle and the second connector into the second receptacle.

One aspect is directed to a method of assembling a panel system. The method includes aligning a first connector on a first panel over a first receptacle in the support member; inserting the first connector into the first receptacle and seating the first connector into the first receptacle with a first connector being shaped to complement the first receptacle; contacting together electrical conductors on the first connector and the first receptacle; aligning a second connector on a second panel over a second receptacle in the support member, the second receptacle being spaced apart from the first receptacle; inserting the second connector into the second receptacle and seating the second connector into the second receptacle with the second connector being shaped to complement the second receptacle; and contacting together electrical conductors on the second connector and the second receptacle.

In one aspect, the method also includes compressing together arms of the first connector while inserting the first connector into the first receptacle and compressing together arms of the second connector while inserting the second connector into the second receptacle.

In one aspect, the method also includes inserting the first connector into the first receptacle and creating a magnetic attraction between the first connector and the support structure by positioning a first magnetic member in the first connector into proximity of a second magnetic member in the support structure.

In one aspect, the method also includes contacting the first panel against a seal positioned in proximity to the first receptacle and contacting the second panel against the seal that is positioned in proximity to the second receptacle.

In one aspect, the method also includes sliding the first connector that has a tapered shaped into the first receptacle that has a complementary tapered shape.

The various aspects of the various embodiments may be used alone or in any combination, as is desired.

BRIEF DESCRIPTION OF THE DRAWINGS

FIG. 13a is a schematic section view of a connector attached to a panel.

FIG. 13b is a schematic section view of a first connector in the process of being connected to a support structure and a second connector already connected to the support structure.

FIG. 14a is a schematic section view of a connector attached to a panel.

FIG. 14b is a schematic section view of a first connector in the process of being connected to a support structure and a second connector already connected to the support structure.

FIG. 15a is a schematic section view of a connector attached to a panel.

FIG. 15b is a schematic section view of a first connector in the process of being connected to a support structure and a second connector already connected to the support structure.

DETAILED DESCRIPTION

Figure 1:
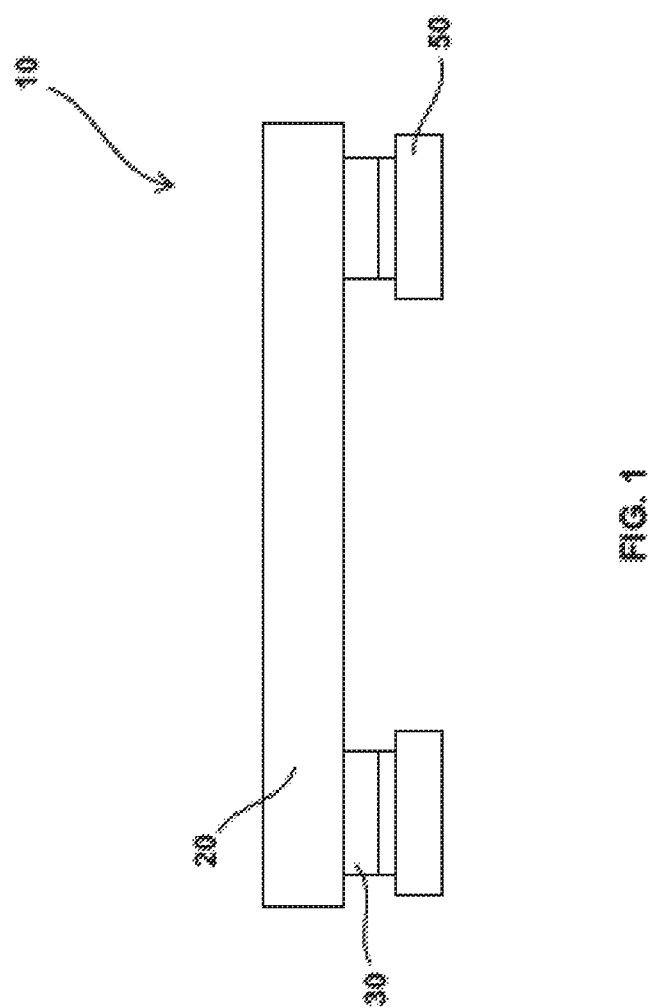
FIG. 1 is a schematic side view of a system that includes a panel with connectors that are engaged with a support structure.

The present application is directed to a connection interface between a panel and a support structure. As illustrated in FIG. 1, a panel 20 includes one or more connectors 30. A support structure 50 that supports the panel 20 is configured to engage with the one or more connectors 30 to secure the panel 20. The connection interface between the panel 20 and the support structure 50 provides a mechanical connection to secure the panel 20, and can also provide for electrical connections between the panel 20 and support structure 50 and/or between the panel 20 and one or more other panels 20 or remote components.

Figure 2:
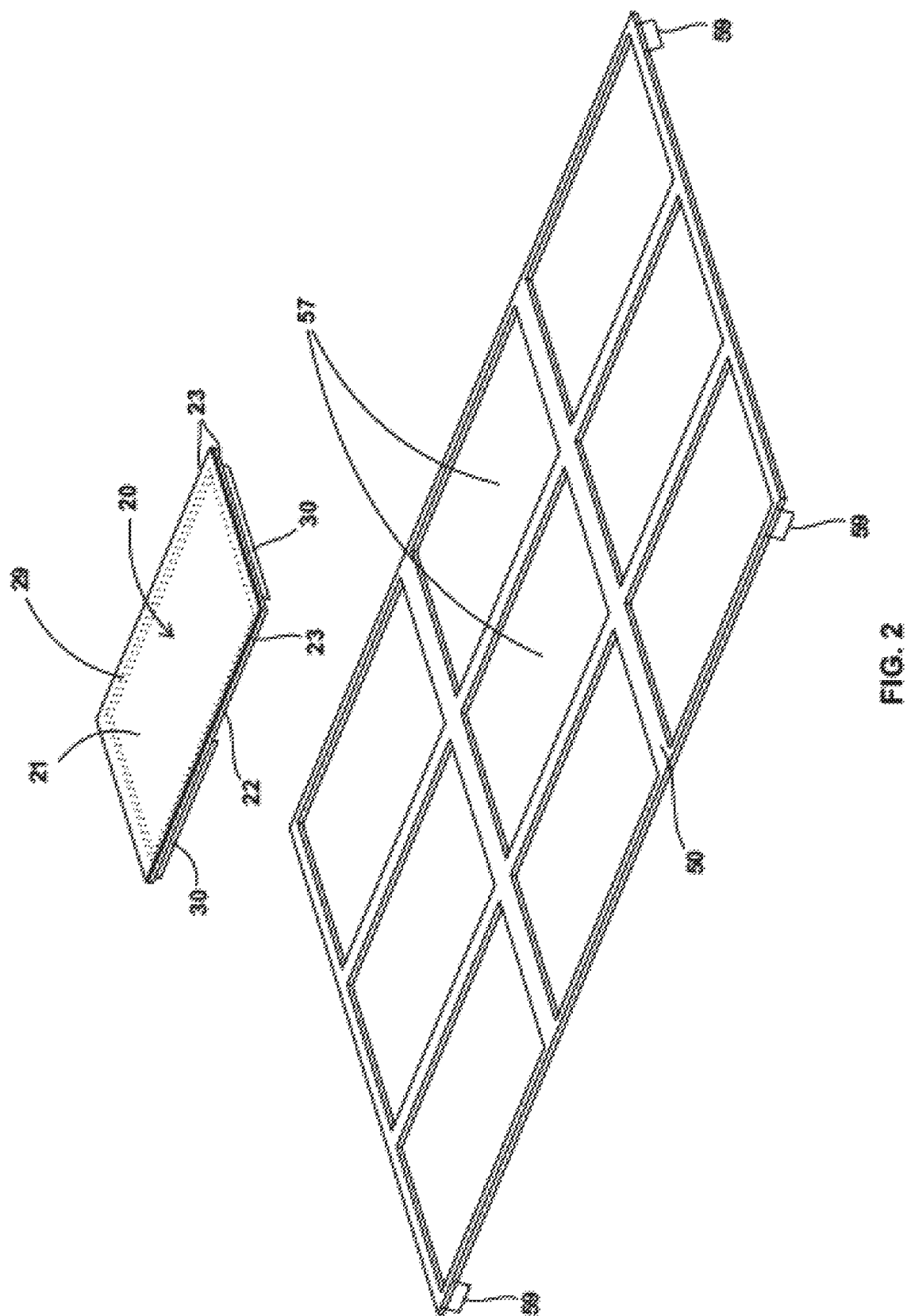
FIG. 2 is an exploded perspective view of a panel with connectors being attached to a support structure.

FIG. 2 illustrates an exploded view of a panel 20 equipped with connectors 30. The support structure 50 is configured to receive and engage with the panel 20 and connectors 30. The connectors 30 are positioned along one or more of a bottom side and lateral sides of the panel 20 to contact against the support structure 50. The support structure 50 can include openings 57 across which the panels 20 extend with perimeter edges 23 and connectors 30 contacting against the support structure 50 and the central section of the panel 20 extending across the opening 57.

A variety of different panels 20 can be attached to the support structure 50. As illustrated in FIG. 2, the panels 20 each include a first side 21 and a second side 22. The sides 21, 22 can each be planar and have a constant thickness measured between the sides 21, 22. The panels 20 can also include the sides 21, 22 having different configurations such that the panel 20 has a varying thickness. The perimeter edges 23 extend between the sides 21, 22 and can include a variety of shapes such as straight as illustrated in FIG. 2, curved, and various combinations. The panel 20 can include a variety of different shapes including but not limited to polygonal, circular, and oval.

The panels 20 can be configured for use in a variety of different environments and for a variety of different purposes. These include but are not limited to solar panels 20, wall panels 20, glass panels 20 (e.g., windows, doors), ceiling panels 20, and internal building panels 20 constructed from a variety of materials such as sheetrock, plywood, and fiberglass. One aspect includes a solar panel 20 configured to obtain usable solar power through photovoltaics. Solar cells can be positioned between the first and second sides 21, 22 and absorb and convert sunlight into electricity. The panel 20 is also equipped with various electrical contacts and cabling, and various electronic components such as an inverter to change the electric current from DC to AC.

The panels 20 can include an electrical bus 29. The electrical bus 29 can extend along one or more of the perimeter edges 23. The electrical bus 29 provides for conducting power along the panel 20.

Figure 3:
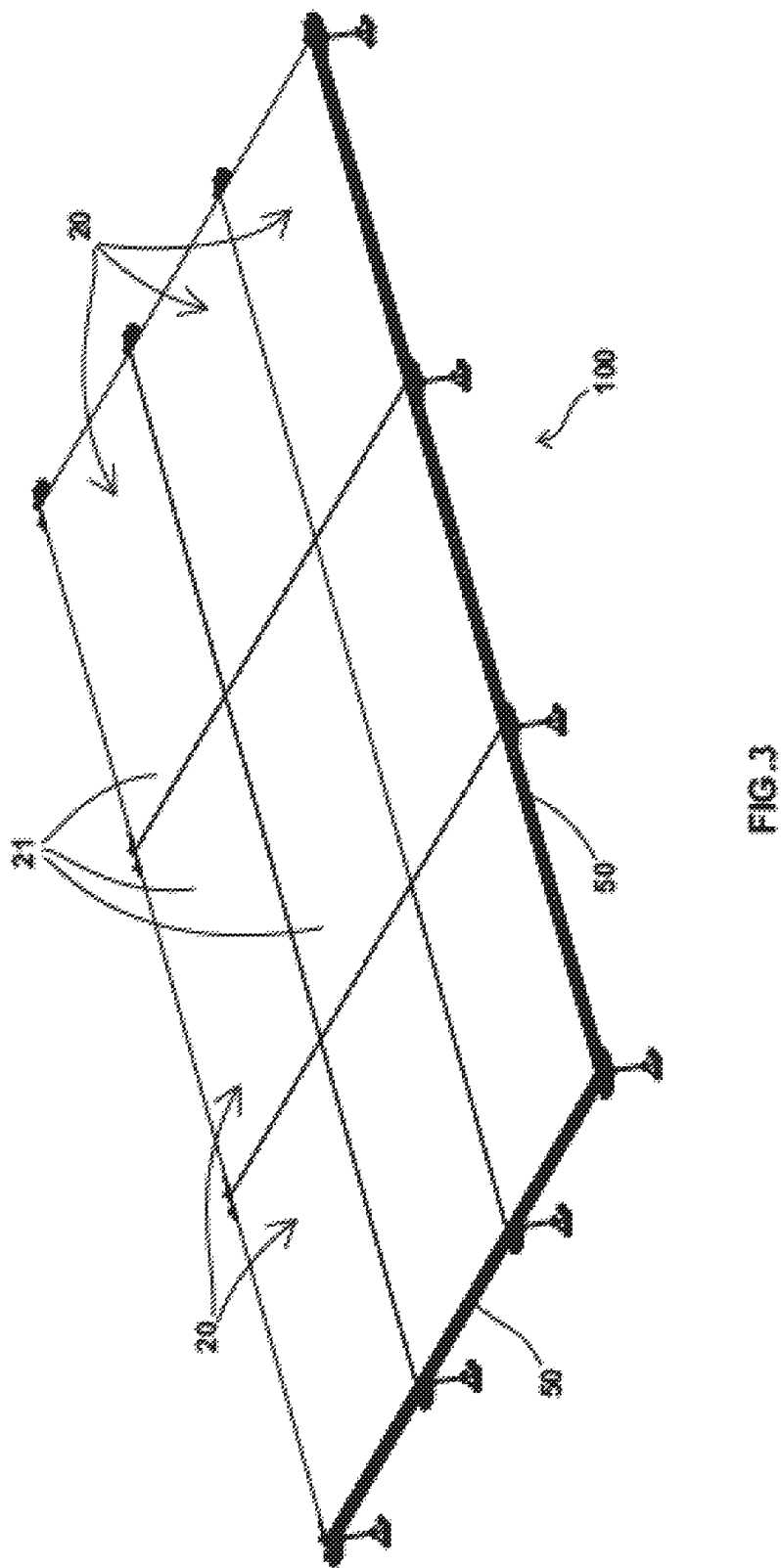
FIG. 3 is a sectional view of an array that includes multiple panels connected to a support structure.

Two or more panels 20 can be connected to the support structure 50 to form an array 100 as illustrated in FIG. 3. The panels 20 are positioned with the first sides 21 being exposed and facing away from the support structure 50. The second sides 22 face in an opposing direction towards the support structure 50. The connectors 30 are positioned on the panels 20 to engage with the support structure 50 when the panels 20 are inserted onto and/or into the support structure 50.

Figure 4:
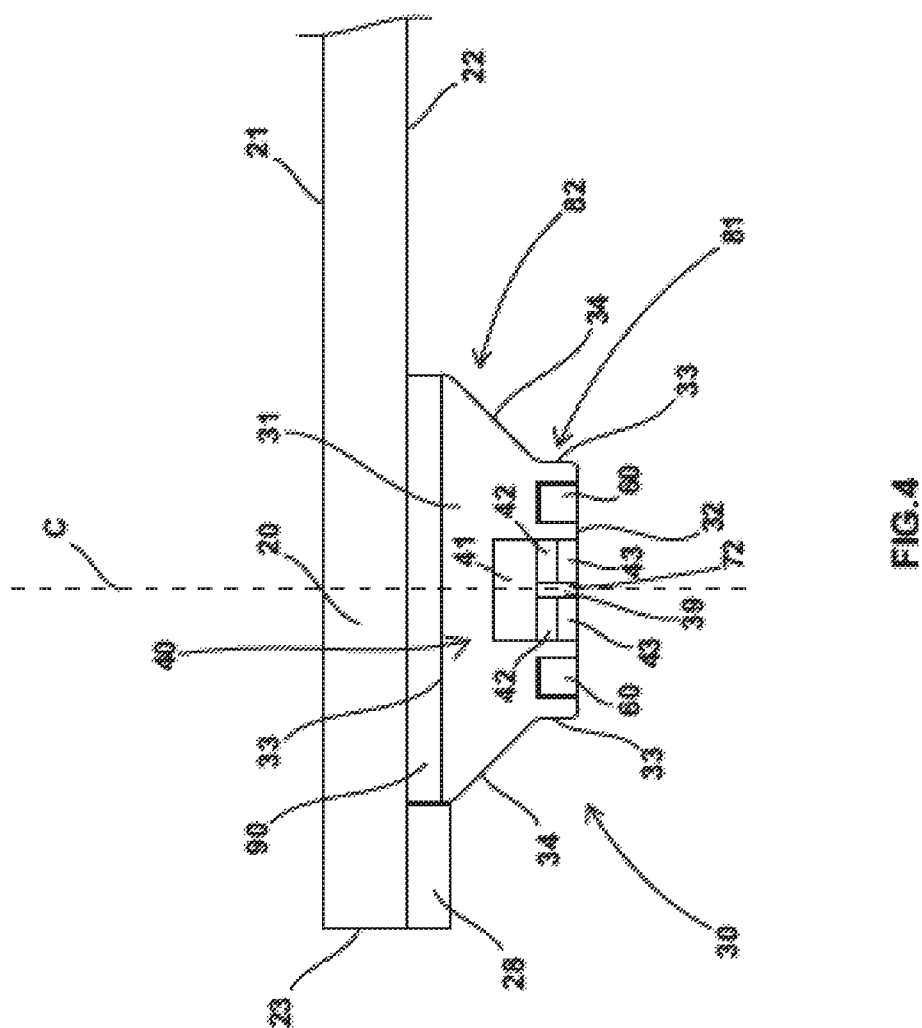
FIG. 4 is a schematic section view of a connector attached to a panel.

The connectors 30 extend from the panel 20 and are configured to engage with the support structure 50. FIG. 4 illustrates a connector 30 that is connected to and extends from second side 22 of the panel 20. The connector 30 includes a body 31 that is shaped to align and engage with the support structure 50. The body 31 includes an exposed side 32 and an opposing side 33 that is attached to the panel 20. A centerline C extends along the body 31 through the sides 32, 33.

The body 31 can be attached to the panel 20 by a variety of means, including but not limited to adhesives and mechanical fasteners. A foam tape 90 can be positioned between the side 33 and the panel 20. The foam tape 90 can prevent the ingress of water and/or debris.

Figure 12:
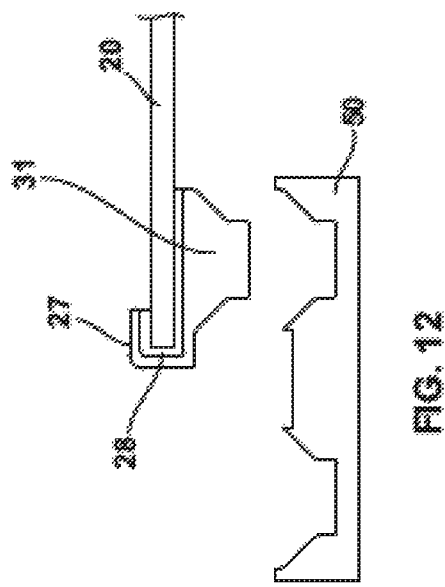
FIG. 12 is a schematic section view of a connector attached to a panel.

FIG. 12 includes the body 31 attached to the panel 20 by a frame 27 that wraps around the perimeter edge 23 of the panel 20. A seal 28 can be positioned between the frame 27 and the panel 20 to prevent the ingress of water and/or debris.

The body 31 can be attached to the panel 20 by other means. These can include but are not limited adhesives and mechanical fasteners. The body 31 and panel 20 can also be integrally made, such as by an injection-molded panel 20 that includes the body 31 in the single-piece construction.

As illustrated in FIG. 4, the body 31 includes a generally tapering shape that is wider at the side 33 and narrows towards the side 32. This tapering shape aligns and engages the panel 20 relative to the support structure 50. The body 31 includes a first section 81 formed between sides 33. The sides 33 can be parallel to the centerline C of the body 31 with a width measured between the sides 33 being the same throughout the first section 81. The body 31 also includes a second section 82 formed between sides 34. The width of the second section 82 narrows away from the panel 20 as the sides 34 taper towards the centerline C. The sides 34 can be aligned at various angles relative to the centerline C, including an acute angle as illustrated in FIG. 4. Each of the sides 34 can be aligned at the same angle providing a symmetrical shape as illustrated in FIG. 4. Alternatively, the sides 34 can be aligned at different angles relative to the centerline C. A seal 28 can be positioned between the body 31 at the perimeter edge 23 of the panel 20.

Figure 5:
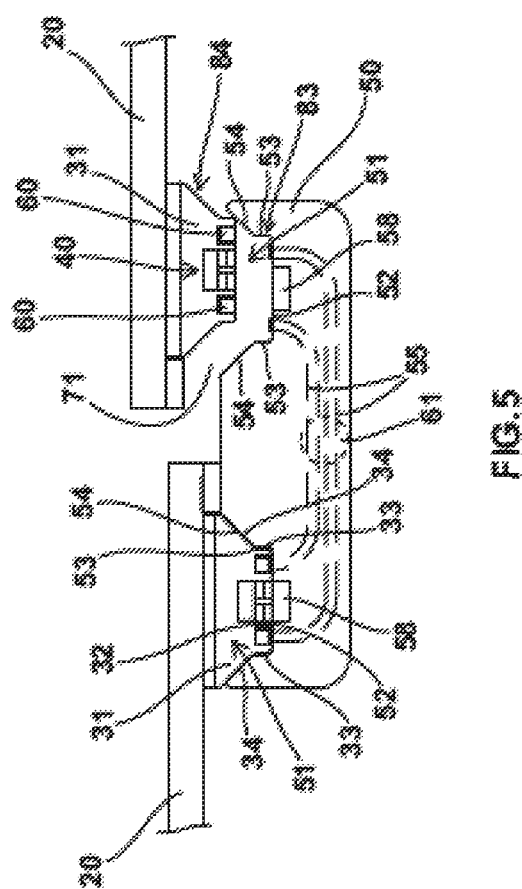
FIG. 5 is a schematic section view of a first panel with a first connector being attached to a support structure with a second panel and second connector attached to the support structure.

The shape of the body 31 can correspond to the shape of the support structure 50. As illustrated in FIG. 5, the support structure 50 includes a receptacle 51 shape to receive the body 31. The receptacle 51 includes an open side 71, and lateral sides 53, 54 that lead to a bottom 52. The bottom 52 includes a shape to match the shape of side 32. The bottom can have various shapes, including but not limited to flat and curved. A first section 83 is formed between sides 53 and includes a shape and size that corresponds to the first section 81. A second section 84 is formed between sides 54 and has a tapered shape and size that corresponds to the second section 82 of the body 31 of the connector 30. The body 31 can also include a shape that does not correspond to the support structure 50.

The complementary tapering shapes of the body 31 and receptacle 51 facilitate the engagement of the panel 20 to the support structure 50. As illustrated in FIG. 5, the panel 20 on the right is being inserted onto the support structure 50. The body 31 contacts against the side 54 of the receptacle 51 and is funneled downward towards the bottom 52. The panel 20 on the left is fully seated with the body 31 in the receptacle 51. The side 32 of the body 31 is positioned at the bottom 52 of the receptacle 51. Sides 33 align with sides 53 and sides 34 align with sides 54.

The connector 30 and support structure 50 are configured to create a magnetic attraction force. The magnetic attraction force facilitates seating of the connector 30 with the support structure 50. The magnetic attraction force can also assist in maintaining the connection between the connector 30 and the support structure 50. The magnetic member 40 can be exposed on the side 32, or can be recessed within the body 31 and spaced a distance from the side 32. The magnetic member 40 can be centered in the body 31 and extend on both sides of the centerline C.

The magnetic attraction force is created between a magnetic member 40 positioned in the connector 30 and a magnetic member 58 positioned in the support structure 50. Each of the magnetic members 40, 58 can include one or more permanent magnets, electromagnets, and ferromagnetic material. FIGS. 4 and 5 illustrate the magnetic member 40 positioned in the connector 30 including a ferromagnetic core 41, with one or more magnets 42 and ferromagnets 43. The interacting magnetic member 58 is positioned at the bottom 52 of the receptacle 51 to create the magnetic attraction force. The magnetic member 40 can be exposed on the side 32, or can be recessed within the body 31 and spaced a distance from the side 32. The magnetic member 58 can be centered along the bottom 52, or can be offset with the positioning configured to align with the magnetic member 40. In another design, the support structure 50 can include the magnetic member with the ferromagnetic core 41, with one or more magnets 42 and ferromagnets 43, and the connector 30 can include the interacting magnetic member.

The connector 30 can also include a light path 39 to accommodate light signals that can move along the panels 20 and/or support structure 50. The light path 39 can be bordered by one or more walls 72. The walls 72 can be formed by the body 31, or components of the connector 30 such as the magnetic member 40 as illustrated in FIGS. 4 and 5. In the various designs, the number, size, and shape of the one or more walls 72 may vary. The walls 41 can also be constructed such that the light signals may be reflected off the walls 41 when traveling along the light path 39. This can occur when the origination and destination points are not within a direct line of sight. The light paths 39 can include free space as illustrated in FIGS. 4 and 5 that allow for the signal transmission. The light paths 39 can also include optical fiber extending through the free space. As illustrated in FIG. 2, the light paths 39 provide for the transmission of the light signals. The light paths 39 can extend between nodes 59 on the support structure 50, between nodes 59 on the same panel 20, between nodes 59 on different panels 20, and various other configurations for directing light signals between points. For example, the light paths 39 can extend between a transmitter of a first node 59 and a receiver of a second node 59. Light paths, nodes, and electrical components that receive the light signals are disclosed in U.S. application Ser. No. 15/711,773 filed on Sep. 21, 2017 which is hereby incorporated by reference in its entirety.

Electrical conductors 60 are electrically connected to the bus 29 and extend in the connector 30. The electrical conductors 60 are positioned to engage with corresponding conductors 55 in the support structure 50. The conductors 60 can be positioned along the bottom 52 to engage with and create an electrical connection when the connector 30 is seated and engaged with the support structure 50.

The conductors 55 in the support structure 50 engage with and create electrical connections with the one or more panels 20. The conductors 55 can be exposed at the receptacle 51 to electrically connect with the panels 20 and extend to a main bus 61 that extends along the support structure 50. The conductors 55 can extend to other receptacles 51 to electrically connect together different panels 20.

Figure 6:
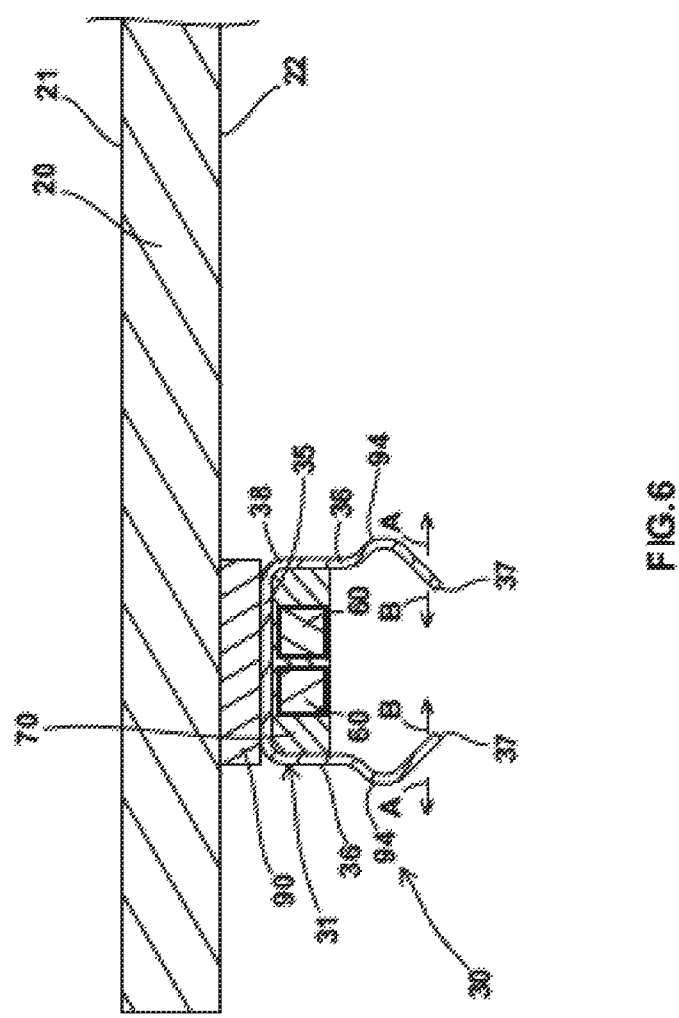
FIG. 6 is a schematic section view of a connector attached to a panel.

The connectors 30 can include different configurations to physically and electrically connect to the support structure 50. FIG. 6 illustrates a connector 30 that extends outward from the second side 22 of the panel 20. The connector 30 includes a body 31 with a first member 38 shaped to engage with the support structure 50. The first member 38 of the body 31 includes a base 35 and a pair of opposing arms 36 that each terminate at a tip 37. Each of the arms 36 includes an elbow 94 between the base 35 and the tip 37. The body 38 is constructed from a flexible material, such as but not limited to metal and plastic. The arms 36 are configured to flex outward in the direction of arrows A and inward in the direction of arrows B.

The body 31 can also include an insulating plug 70 positioned at the base 35 between the arms 36. The insulating plug 70 is constructed from an insulating material, such as plastic and forms a support for the conductors 60. The insulating plug 70 is attached to the first member 38 via adhesives and/or mechanical fasteners.

Figure 7:
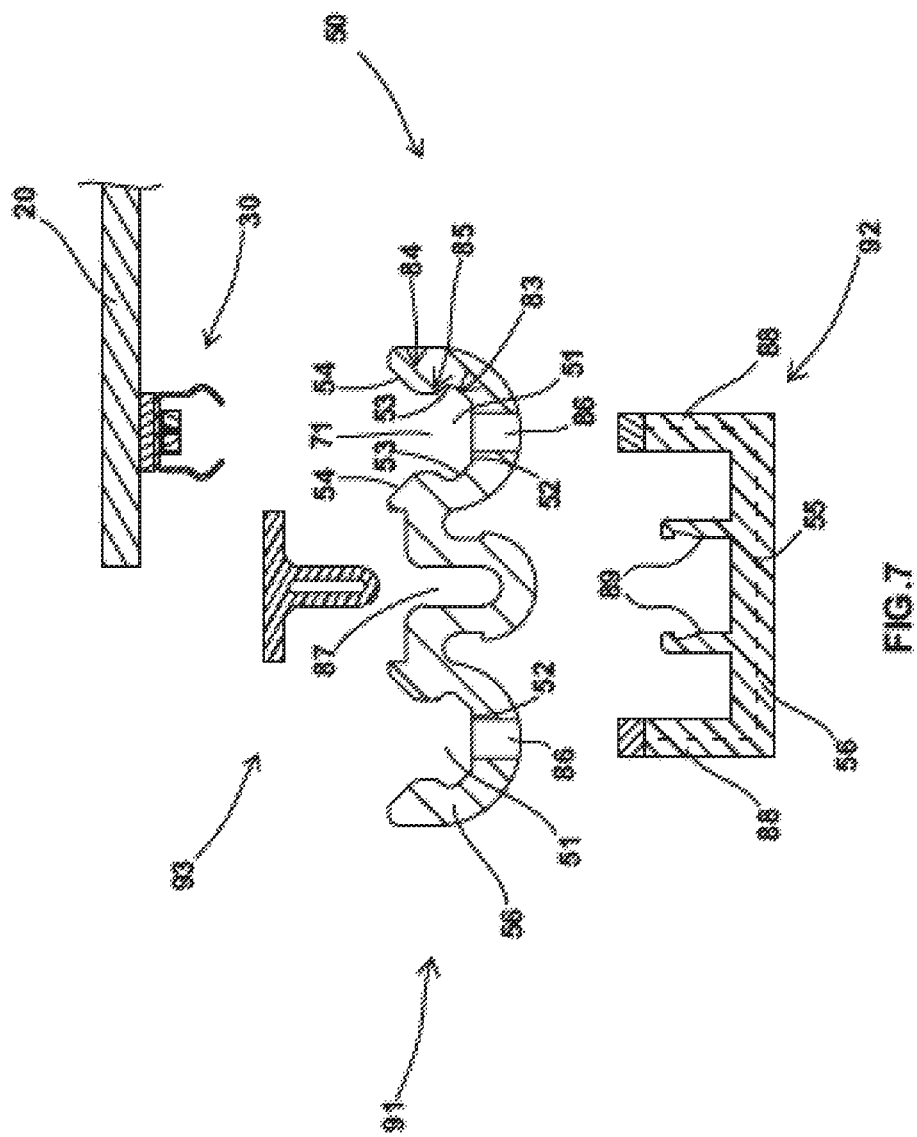
FIG. 7 is an exploded section view of a support structure and a panel with a connector.

FIG. 7 illustrates an exploded view of the support structure 50 that engages with the connector 30. The support structure 50 includes a support 91, a connector 92, and a seal 93. The support 91 includes an undulating shape that forms receptacles 51 to receive a pair of connectors 30. Each receptacle 51 includes an open side 71 with sides 53, 54 that lead to a bottom 52. A first section 83 formed between sides 53 includes a tapering shape that increases in width away from the bottom 52. A second section 84 is positioned outward from the first section 83 and includes a tapering shape that also increases in width away from the bottom 52. A neck section 85 is positioned between the first and second sections 83, 84 and includes a smaller width. An opening 86 is positioned along the bottom 52 of each receptacle 51.

The support 91 also includes a receptacle 87 positioned along a central section between receptacles 51. This receptacle 87 is sized to receive the seal 93. The seal 93 also accommodates changes in the sizing due to thermal heating and cooling.

The connector 92 is configured to engage with the support 91. The connector 92 includes a base 56 with a pair of outer arms 88 and a pair of inner arms 89. The outer arms 88 are sized and shaped to extend through the openings 86 in the receptacles 51. The inner arms 89 are sized and shape to engage with the support 91. Electrical conductors 55 can extend through the connector 92 to electrical connect with the panels 20. The conductors 55 can extend through the outer arms 88 and be exposed within the receptacles 51 when the connector 92 is connected to the support 91.

The seal 93 is configured to contact against the panels 20 and the support 91. The seal 93 can be constructed from a flexible material to deform and create continuous contact between these elements.

Figure 8:
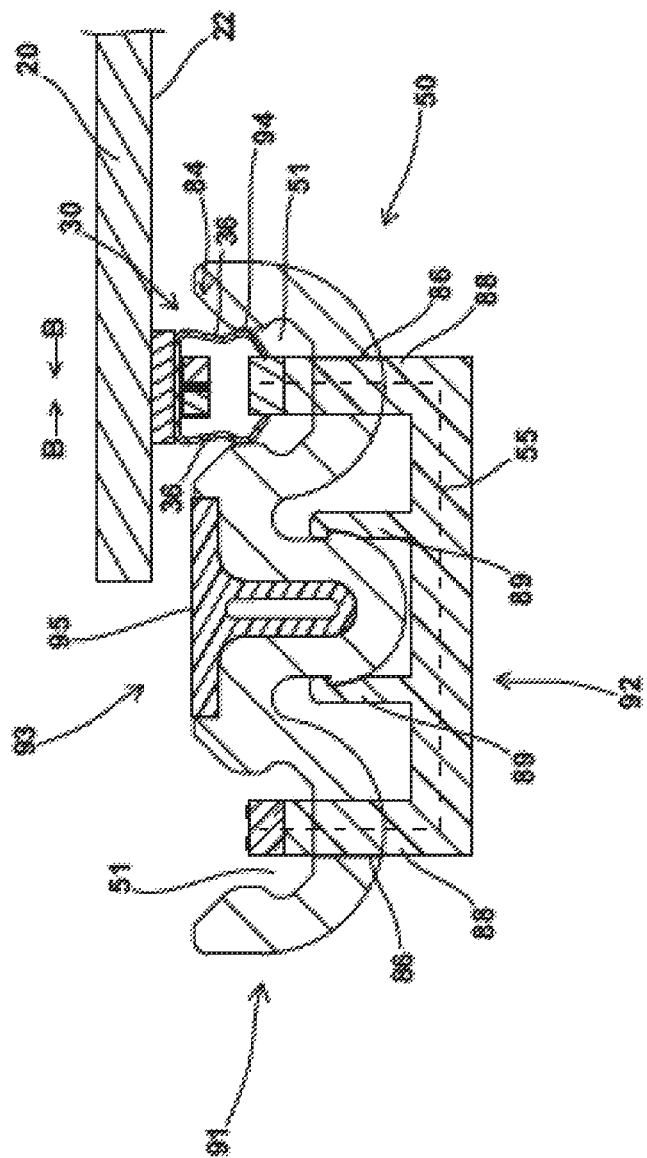
FIG. 8 is a schematic section view of a connector on a panel being attached to a support structure.

FIG. 8 illustrates the support 91, connector 92, and seal 93 of the attached together to form the support structure 50. The inner arms 89 include tabs that engage with corresponding tabs on the support 91. The outer arms 88 extend through openings 86 and into the receptacles 51. The conductors 55 can be exposed in the receptacles 51 to engage with connectors 30. The seal 93 is positioned in the receptacle 87 between the receptacles 51. An exposed edge 95 is positioned to contact against the second sides 22 of a pair of panels 20. Two or more of the support 91, connector 92, and seal 93 can be connected together by snap fit, such as the inner arms 89 being engaged with the support 91. Mechanical fasteners and/or adhesives can also be used for the connection.

Figure 9:
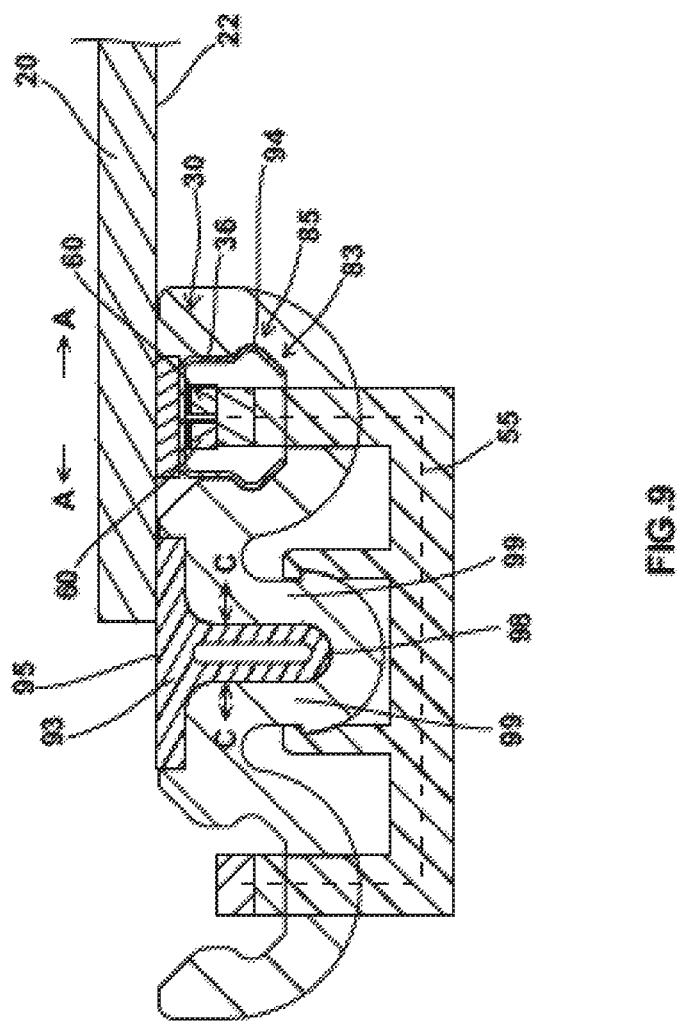
FIG. 9 is a schematic section view of a panel with a connector connected to a support structure.

FIGS. 8 and 9 illustrate the connection of the connector 30 with the support structure 50. As illustrated in FIG. 8, the panel 20 is positioned with the connector 30 located at the receptacle 51. The panel 20 is moved towards the support structure 50. This movement positions the arms 36 against the walls 54 of the second section 84 of the receptacle 51. Specifically, the elbows 94 slide along the walls of the receptacle 51. The tapered shape of the second section 84 causes the arms 36 to be forced inward in the direction of arrows B as the panel 20 moves into engagement. Continued movement causes the arms 36 to slide along the neck section 85.

As illustrated in FIG. 9, further movement causes the elbows 85 to move beyond the neck section 85. This causes the arms 36 to spring outward in the direction of arrows A and into the first section 83. The arms 36 may not fully spring outward thus the arms 36 maintain a force against the walls of the first section 83 to maintain the engagement. Further, the width at the elbows 94 is greater than the neck section 85. The shape of the arms 36 corresponds to the first section 83 during the engagement.

The full seating and engagement of the connector 30 as illustrated in FIG. 9 positions the conductors 60 in contact with the one or more conductors 55 in the support structure 50. This provides for electrical connection between the panel 20 and the support structure 20 and/or other panels 20 or components.

As further illustrated in FIG. 9, legs 99 form a receptacle 98 that receives the seal 93. The legs 99 can flex to accommodate thermal expansion between the adjacent panels 20.

Figure 10:
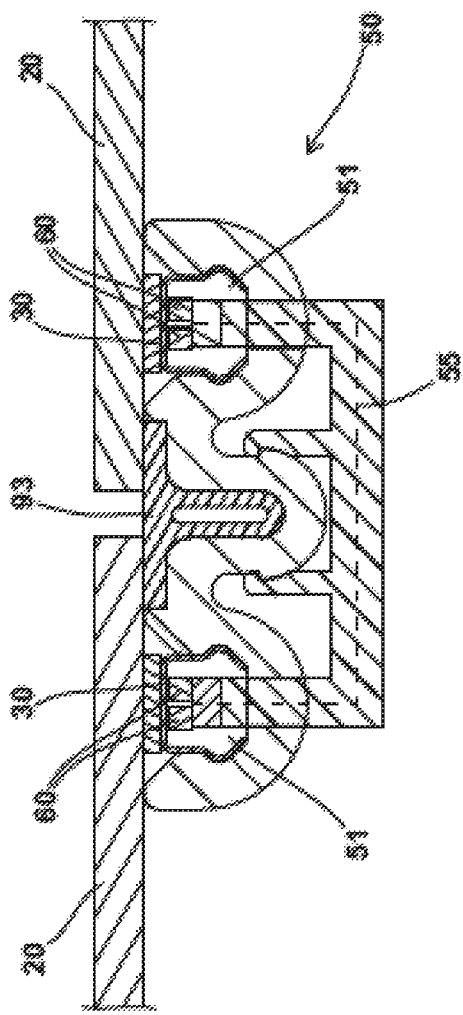
FIG. 10 is a schematic section view of a pair of panels each with a connector connected to a support structure.

FIG. 10 illustrates a pair of panels 20 attached to the support structure 50. A first panel 20 is positioned with its connector 30 engaged with the corresponding receptacle 51. This further positions the one or more conductors 60 in contact with the one or more conductors 55 in the support member 50. A second panel 20 is likewise positioned with its connector 30 engaged with its corresponding receptacle 51.

Each of the panels 20 contacts against the seal 93. This contact prevents water and/or debris from interfering with the connectors 30 and potentially preventing the electrical connection between the panels 20 and the support structure 50.

Figure 11:
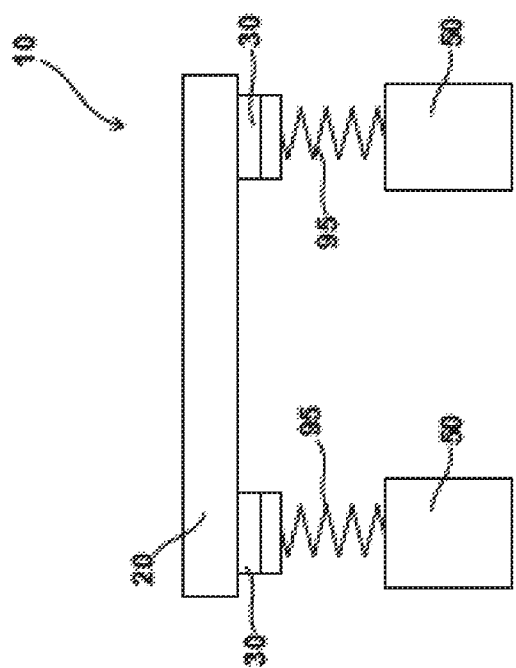
FIG. 11 is a schematic side view of a system that includes a panel with connectors that are engaged with a support structure.

FIG. 11 illustrates a panel system 10 that includes one or more flexible members 95 positioned between the connectors 30 and the support structure 50. The flexible members 95 can include various configurations including but not limited to springs and flexible material such as rubber and foam. The different flexible members 95 can include the same or different configurations. The flexible members 95 provide for the one or more panels 20 be elevated above the support structure 50. The flexible members 95 can also provide for the one or more panels 20 to be flexible relative to the support structure 50. In a panel array 100, one or more of the panels 20 can be connected to the support structure with flexible members 95, while one or more of the other panels 20 can be connected without flexible members 95.

The system 10 can include a variety of different combination of elements and configurations. Electrical conductors 60 may not be included in one or more of the panels 20. A seal 95 may not be positioned between adjacent panels 20.

The connectors 30 and support structure 50 can include a variety of structures and configurations. FIG. 13a includes a connector 30 connected to a panel 20. The connector 30 includes an elongated body 31 that forms a base 35 and a pair of opposing arms 36. Each of the arms 36 is shaped with a narrow elbow 94 that are aligned and tips 37. The arms 36 are constructed to be flexible and flex inward and outward as shown by arrows A and B.

FIG. 13b illustrates a pair of panels 20 each equipped with connectors 30 as disclosed in FIG. 13a. The support structure 50 is shaped to correspond to the connectors 30. The support structure 50 includes receptacles 51 each sized and shaped to connect with one of the connectors 30. Each receptacle 51 includes an enlarged head 73 and a narrow neck 74. As illustrated with the panel 20 and connector 30 on the right of FIG. 13b, the arms 36 flex outward as illustrated by arrows A as the connector 30 is being forced onto the receptacle 51. The elbow neck 94 slides over the head forcing the arms 36 outward. As illustrated with the panel 20 and connector 30 on the left of FIG. 13b, the arms 36 rebound and flex inward in the direction of arrows B once the necks 94 have moved beyond the head 73. The necks 94 of the connector 30 are positioned at the neck 74 of the support structure 50. Electrical conductors 55 are positioned at the head 73 to electrically engage with the conductors 60 in the connector 30.

FIG. 14a illustrates a connector 30 with a pair of indents 63 and elbows 64 formed along an outer edge 94. A central section between the indents 63 positions the electrical conductors 60. The support structure 50 includes a pair of receptacles 51 each configured to connect with one of the connectors 30. Each receptacle 51 includes a pair of arms 75 that extend outward from a bottom 52. The arms 75 are constructed from a flexible material and are shaped to conform to the outer edge 94. As illustrated with the receptacle 51 on the left of FIG. 14b, the arms 75 flex inward in the direction of arrows C when the connector 30 is being attached to the support structure 50. The arms 75 move beyond a narrow section of the indents and flex outward in the direction of arrows D when the connector 30 and panel 20 are connected. When connected, the electrical conductors 60 on the connectors 30 are electrically connected to the conductors 55 in the support structures 50.

FIG. 15a illustrates another connector 30 shaped with an enlarged head 76 and narrow neck 77. The electrical conductors 60 are positioned at the head 76. As illustrated in FIG. 15b, the receptacles 51 include arms 75 that extend outward beyond the bottom 52. The arms 75 are constructed from a flexible material to flex outward in the direction of arrows A as illustrated on right-hand connector 30 of FIG. 15b. The arms 75 then flex inward when aligned with the narrow neck 77.

Figure 16A:
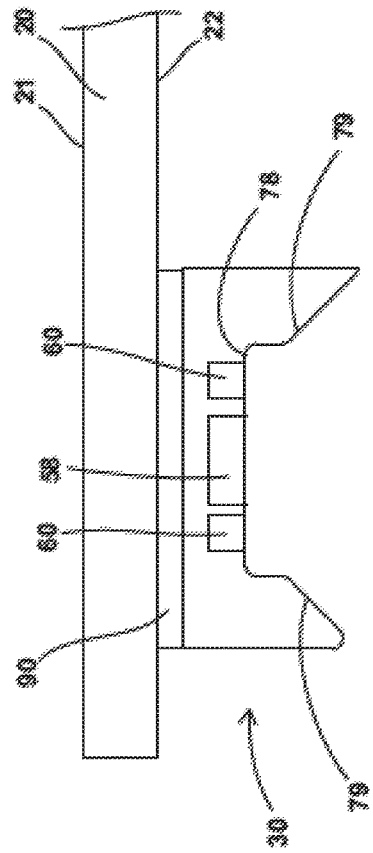
FIG. 16a is a schematic section view of a connector attached to a panel.
Figure 16B:
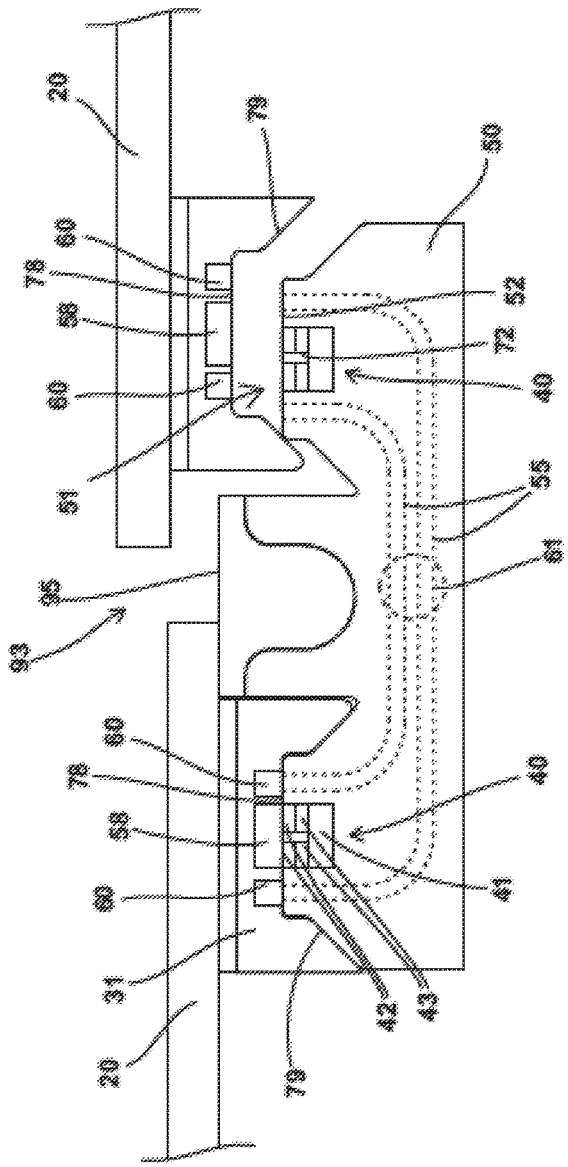
FIG. 16b is a schematic section view of a first connector in the process of being connected to a support structure and a second connector already connected to the support structure.

FIG. 16a with an open shape having a bottom 78 and lateral sides 79. As illustrated in FIG. 16b, receptacles 51 on the support structure 50 include a complementary shape. When the connector 30 is attached in the receptacle 51, the bottom 78 of the connector 30 is in proximity for the electrical conductors 60 to be electrically connected to the electrical conductors 55. Magnetic members 40 in the support structure 50 are magnetically attracted to magnetic members 58 in the connectors 30 to maintain the connection.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. An assembly, comprising:
    first and second panels each comprising a planar first side, opposing second side, and lateral sides that extend between the first and second sides;
    connectors attached to each of the first and second panels, each of the connectors extends outward from the second side and comprises a centerline that is transverse to the planar first side of the panels, each of the connectors comprising opposing first and second arms that are movable between a first shape and a deformed shape, and each of the connectors further comprising a first electrical conductor;
    a support structure comprising first and second receivers each comprising a second shape that complements the first shape and a second electrical conductor;
    wherein each of the panels is configured to attach to the support structure by the connector deforming to the deformed shape during the initial engagement with the receiver as the first shape complements the second shape for each of the first and second arms of the connector to seat against the receiver and each of the first electrical conductors is positioned at and electrically connected to one of the second electrical conductors when the first and second panels are attached to the support structure; and
    the first planar surfaces of the first and second panels are aligned in a plane when the panels are attached to the support structure.

2. The assembly of claim 1, further comprising the second electrical conductors at each of the first and second receptacles being electrically connected together.

3. The assembly of claim 1, wherein each of the connectors further comprises a first magnetic member positioned between the first and second arms, each of the first and second receivers further comprises a second magnetic member, and for each of the panels the first magnetic member is positioned at the second magnetic member to create a magnetic attraction force that pulls the connector against the receiver when the panel is attached to the support member.

4. The assembly of claim 1, wherein the first shape is a tapered shape that is wider towards the panel and narrows away from the panel.

5. The assembly of claim 4, wherein the receivers comprise a cavity with an open side and a closed side, the second shape of the receivers is a tapered shape that is wider at the open side and that narrows towards the closed side.

6. The assembly of claim 3, wherein for each of the connectors the first electrical conductor and the first magnetic member are both exposed on the connector and for the receivers the second electrical conductor and the second magnetic member are both exposed in the receiver.

7. The assembly of claim 1, wherein each of the connectors comprises a base that is positioned towards the panel and the first and second arms that extend outward from the base and are spaced apart by a gap, each of the arms comprises an elbow positioned between the base and a tip, and with a width of the gap measured between the arms being greatest at the elbows.

8. An assembly, comprising:
a first panel comprising a planar top and a bottom and narrow lateral sides;
a first connector attached to and extending outward from the bottom of the first panel, the first connector comprising:
a first shape with a first side at the first panel and a second side away from the first panel;
a first electrical conductor positioned at the second side;
a second panel comprising a planar top and a bottom and narrow lateral sides;
a second connector attached to and extending outward from the bottom of the second panel, the second connector comprising:
a second shape with a third side at the second panel and a fourth side away from the second panel;
a second electrical conductor positioned at the fourth side;
a support structure comprising:
a first receptacle with a first open side, a first bottom side, and first walls that extend between the first open side and the first bottom side, the first receptacle comprising a third shape that complements the first shape for the first connector to fit within the first receptacle when the first panel is attached to the support structure, the first receptacle comprising a third electrical conductor positioned at the first bottom side, with the third electrical conductor positioned at and electrically connected to the first electrical conductor when the first panel is attached to the support structure;
a second receptacle with a second open side, a second bottom side, and second walls that extend between the second open side and the second bottom side, the second receptacle comprising a fourth shape that complements the second shape for the second connector to fit within the second receptacle when the second panel is attached to the support structure, the second receptacle comprising a fourth electrical conductor positioned at the second bottom side, with the fourth electrical conductor positioned at and electrically connected to the second electrical conductor when the second panel is attached to the support structure;
the first and second receptacles comprising widths that vary between the open side and the bottom side;
the planar tops of the first and second panels are aligned in a plane when the first and second panels are attached to the support structure.

9. The assembly of claim 8, wherein the first shape and the second shape are the same, and the third shape and the fourth shape are the same.

10. The assembly of claim 8, wherein the third and fourth electrical conductors are electrically connected together.

11. The assembly of claim 8, further comprising each of the first and second connectors comprising a base and a pair of spaced-apart arms.

12. The assembly of claim 8, further comprising magnetic members in each of the first and second connectors that are attracted to second magnetic members in each of the first and second receptacles, the first and second magnetic members configured to create a magnetic attraction force to pull the first connector into the first receptacle and the second connector into the second receptacle.

13. A method of assembling a panel system, the method comprising:
aligning a first connector on a first panel over a first receptacle in a support structure with the first connector extending outward from a bottom of the first panel;
moving the first panel orthogonally towards the support structure and inserting the first connector into the first receptacle, deforming the first connector, and seating the first connector into the first receptacle with the first connector being shaped to complement the first receptacle;
contacting together electrical conductors on the first connector and the first receptacle;
aligning a second connector on a second panel over a second receptacle in the support structure with the second connector extending outward from a bottom of the second panel, the second receptacle being spaced apart from the first receptacle;
moving the second panel orthogonally towards the support structure and inserting the second connector into the second receptacle, deforming the second connector, and seating the second connector into the second receptacle with the second connector being shaped to complement the second receptacle and with narrow lateral sides of the first and second panels facing together; and
contacting together electrical conductors on the second connector and the second receptacle.

14. The method of claim 13, further comprising compressing together arms of the first connector while inserting the first connector into the first receptacle and compressing together arms of the second connector while inserting the second connector into the second receptacle.

15. The method of claim 13, further comprising inserting the first connector into the first receptacle and creating a magnetic attraction between the first connector and the support structure by positioning a first magnetic member in the first connector into proximity of a second magnetic member in the support structure.

16. The method of claim 13, further comprising contacting the first panel against a seal positioned in proximity to the first receptacle and contacting the second panel against the seal that is positioned in proximity to the second receptacle.

17. The method of claim 13, further comprising sliding the first connector that has a tapered shaped into the first receptacle that has a complementary tapered shape.

18. The assembly of claim 1, wherein the first and second panels are photovoltaic solar panels.

19. The assembly of claim 8, wherein the first and second panels are photovoltaic solar panels.

20. The method of claim 13, further comprising aligning tops of the first and second panels and forming a photovoltaic solar member.

21. The assembly of claim 1, wherein the first and second panels are ceiling panels.

22. The assembly of claim 8, wherein the first and second panels are ceiling panels.

23. The method of claim 13, further comprising attaching the first and second panels to the support structure and forming a ceiling with the first and second panels.

* * * * *